(12) United States Patent
Zhang et al.

(10) Patent No.: US 8,319,858 B2
(45) Date of Patent: Nov. 27, 2012

(54) ELECTRONIC APPARATUS AND METHOD FOR RECEIVING SOUNDS WITH AUXILIARY INFORMATION FROM CAMERA SYSTEM

(75) Inventors: Ming Zhang, Cupertino, CA (US); Chi-Chian Yu, San Ramon, CA (US)

(73) Assignee: Fortemedia, Inc., Sunnyvale, CA (US)

( * ) Notice: Subject to any disclaimer, the term of this patent is extended or adjusted under 35 U.S.C. 154(b) by 799 days.

(21) Appl. No.: 12/262,378

(22) Filed: Oct. 31, 2008

(65) Prior Publication Data
US 2010/0110232 A1   May 6, 2010

(51) Int. Cl.
*H04N 5/76* (2006.01)
*G03B 13/00* (2006.01)
*H04R 3/00* (2006.01)
(52) U.S. Cl. ................ 348/231.4; 348/345; 381/92
(58) Field of Classification Search ............ 348/231.4, 348/345, 240.1–240.3; 381/92; 367/119
See application file for complete search history.

(56) References Cited

U.S. PATENT DOCUMENTS

| | | | |
|---|---|---|---|
| 2002/0080257 A1* | 6/2002 | Blank | 348/345 |
| 2003/0160862 A1* | 8/2003 | Charlier et al. | 348/14.08 |
| 2005/0195988 A1* | 9/2005 | Tashev et al. | 381/92 |
| 2006/0139462 A1* | 6/2006 | Fukasawa et al. | 348/231.3 |
| 2006/0280312 A1* | 12/2006 | Mao | 381/56 |
| 2007/0030381 A1* | 2/2007 | Maeda | 348/345 |

* cited by examiner

*Primary Examiner* — Aung S Moe
*Assistant Examiner* — Mekonnen Dagnew
(74) *Attorney, Agent, or Firm* — McClure, Qualey & Rodack, LLP

(57) ABSTRACT

The invention provides an electronic apparatus. In one embodiment, the electronic apparatus comprises a video camera, a video processing module, an array microphone, and an audio processing module. The video camera adjusts a focal length according to a zoom-in/out control signal and captures an image of a plurality of target objects according to the focal length to generate a raw video signal. The video processing module generates the zoom-in/out control signal to adjust the focal length of the video camera. The array microphone comprises a plurality of microphones converting sounds of the target objects into a plurality of raw audio signals. The audio processing module adjusts a beamwidth for beamforming according to the zoom-in/out control signal, and performs a beamforming process according to the beamwidth on the raw audio signals to generate a first audio signal comprising mainly voice components of the target objects.

17 Claims, 4 Drawing Sheets

ELECTRONIC APPARATUS AND METHOD FOR RECEIVING SOUNDS WITH AUXILIARY INFORMATION FROM CAMERA SYSTEM

BACKGROUND OF THE INVENTION

1. Field of the Invention

The invention relates to array microphones, and more particularly to beamforming.

2. Description of the Related Art

A microphone system with beamforming capability comprises an array microphone and a beamforming module. An array microphone comprises a plurality of microphones. When the array microphone is used to receive a sound from a target object, the microphones of the array microphone convert the sound into a plurality of raw audio signals with slight phase differences therebetween. The beamforming module then performs a beamforming process according to the phase differences of the raw audio signals to generate a processed audio signal comprising sound components coming from a direction of the target object. The processed audio signal therefore comprises more sound components of the target object than the raw audio signals, and a quality of the processed audio signal subsequent to the beamforming process is therefore higher than those of the raw audio signals.

When a beamforming process is performed, the beamforming module must first determine a direction and a receiving range of sounds of the target object, and then filter out noises coming from directions outside of the receiving range to obtain the processed audio signal. To determine the receiving range of sounds of the target object, the beamforming module must perform a plurality of complicated frequency-domain analyses on the raw audio signals generated by the array microphone. The determined receiving range, however, may be inaccurate, thus, erroneously filtering out a portion of sound components of the target object from the raw audio signals and degrading performance of the microphone system. To improve performance of the microphone system, extra auxiliary information for determining a receiving range of a beamforming process is therefore required.

An electronic apparatus, such as a notebook, a cell phone and digital camera, often comprises both a microphone system receiving sounds and a camera system capturing images. When the camera system captures images of a target object, a camera of the camera system must be aimed at the target object for shooting images of the target objects. To obtain an image with a proper covering range of the target object, a focal length of the camera must be properly adjusted. When the camera captures an image of multiple target objects, the camera system performs a face detection process to determine a number of the objects. All of the aforementioned information including the shooting direction, the focal length, and the object number can be used to define the receiving range of a beamforming process of the microphone system. Thus, a method for receiving sounds with auxiliary information from a camera system is provided.

BRIEF SUMMARY OF THE INVENTION

The invention provides an electronic apparatus. In one embodiment, the electronic apparatus comprises a video camera, a video processing module, an array microphone, and an audio processing module. The video camera adjusts a focal length according to a zoom-in/out control signal and captures an image of at least one target object according to the focal length to generate a raw video signal. The video processing module generates the zoom-in/out control signal to adjust the focal length of the video camera. The array microphone comprises a plurality of microphones converting sounds of the target object into a plurality of raw audio signals. The audio processing module adjusts a beamwidth for beamforming according to the zoom-in/out control signal, and performs a beamforming process according to the beamwidth on the raw audio signals to generate a first audio signal comprising mainly voice components of the target object.

The invention also provides an electronic apparatus. In one embodiment, the electronic apparatus comprises a video camera, a video processing module, an array microphone, and an audio processing module. The video camera receives a focal length and captures an image of at least one target object according to the focal length to generate a raw video signal. The video processing module performs an auto focus process to determine the focal length. The array microphone comprises a plurality of microphones converting sounds of the target object into a plurality of raw audio signals. The first audio processing module determines locations of the target object according to the focal length, sets a plurality of beamforming parameter values according to the locations of the target object, and performs a beamforming process according to the beamforming parameter values on the raw audio signals to generate a processed audio signal comprising mainly voice components of the target object.

The invention provides a method for receiving sounds with auxiliary information from a camera system. First, a zoom-in/out control signal is generated for adjusting a focal length of a video camera, wherein the video camera captures an image of at least one target object according to the focal length. The sounds of the target object are then converted into a plurality of raw audio signals with a plurality of microphones of an array microphone. A beamwidth for beamforming is then adjusted according to the zoom-in/out control signal. Finally, a beamforming process is performed according to the beamwidth on the raw audio signals to generate a processed audio signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
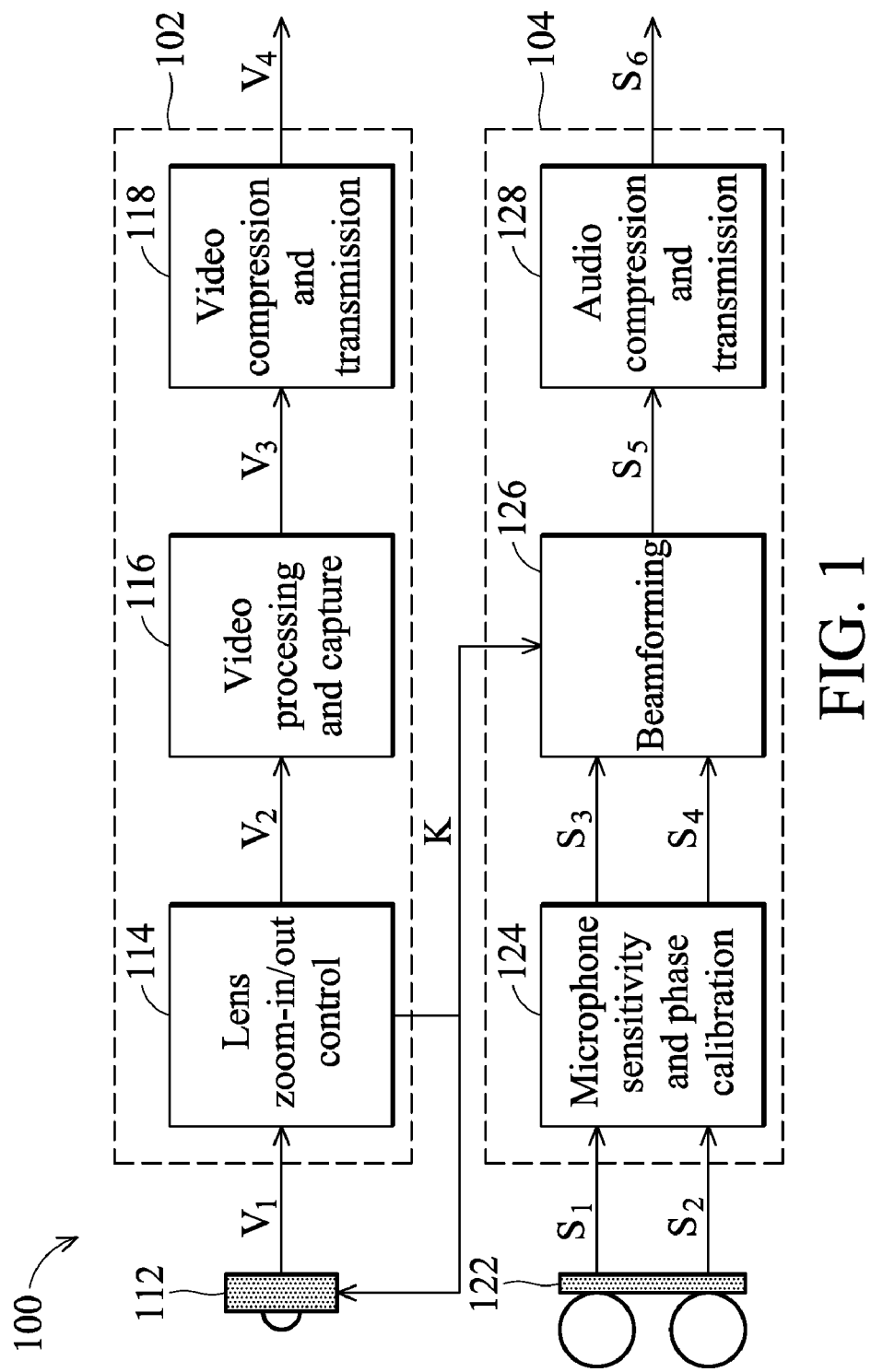
FIG. 1 is a block diagram of an electronic apparatus according to the invention.

Referring to FIG. 1, a block diagram of an electronic apparatus 100 according to the invention is shown. In one embodiment, the electronic apparatus 100 is a notebook, a cell phone, or a personal digital assistant (PDA). The electronic apparatus 100 comprises a video camera 112, a video processing module 102, an array microphone 122, and an audio processing module 104. The video camera 112 adjusts a focal length according to a zoom-in/out control signal K and captures an image of at least one target object according to the focal length to obtain a raw video signal $V_1$. The video processing module 102 comprises a lens zoom-in/out control module 114, a video processing and capture module 116, and a video compression and transmission module 118. The lens zoom-in/out control module 114 generates the zoom-in/out control signal K according to the raw video signal $V_1$ to adjust the focal length of the video camera 112, thus, capturing an image with a proper range covering the target object.

In one embodiment, the lens zoom-in/out control module 114 performs an auto focus process to generate the zoom-in/out control signal K. In another embodiment, a video taker manually adjusts the focal length of the camera 112 through the zoom-in/out control signal K generated by the lens zoom-in/out control module 114. The lens zoom-in/out control module 114 then passes the raw video signal $V_1$ to the video processing and capture module 116 as the video signal $V_2$, and the video processing and capture module 116 then processes the raw video signal $V_2$ to obtain a video signal $V_3$. Finally, the video compression and transmission module 118 compresses the video signal $V_3$ to obtain a video signal $V_4$ with less data amount than that of the video signal $V_3$.

The array microphone 122 comprises a plurality of microphones. The microphones of the array microphone 122 convert sounds of the target object to a plurality of raw audio signals $S_1$ and $S_2$. The multiple raw audio signals $S_1$ and $S_2$ are then delivered to the audio processing module 104. The audio processing module 104 comprises a microphone sensitivity and phase calibration module 124, a beamforming module 126, and an audio compression and transmission module 128. The microphone sensitivity and phase calibration module 124 adjusts amplitudes of the raw audio signals $S_1$ and $S_2$ and calibrates phase mismatches between the raw audio signals $S_1$ and $S_2$ to obtain calibrated audio signals $S_3$ and $S_4$.

The calibrated audio signals $S_3$ and $S_4$ are then delivered to the beamforming module 126. The beamforming module 126 then determines a beamwidth for beamforming according to the zoom-in/out control signal K, and then performs a beamforming process according to the beamwidth on the audio signals $S_3$ and $S_4$ to obtain an audio signal $S_5$. The beamwidth represents an angle range for accepting sound components of the target objects and sounds coming from directions outside of the beamwidth are filtered out from the audio signal $S_5$. The beamwidth determined by the zoom-in/out control signal K is more precise and determines a more proper angle range for accepting sound components of the target object. For example, when the zoom-in/out control signal K lengthens the focal length of the camera 112, the image of the raw video signal $V_1$ covers a wider range. The beamforming module 126 then broadens the beamwidth, thereby generating an audio signal $S_5$ receiving sounds coming from a wider range. When the zoom-in/out control signal K shortens the focal length of the camera 112, the image of the raw video signal $V_1$ covers a narrower range. The beamforming module 126 then narrows the beamwidth, thereby generating an audio signal $S_5$ receiving sounds coming from a narrower range. After the audio signal $S_5$ is generated, the audio compression and transmission module 128 then compresses the audio signal $S_5$ to obtain an audio signal $S_6$ with less data amount than that of the audio signal $S_5$.

Figure 2:
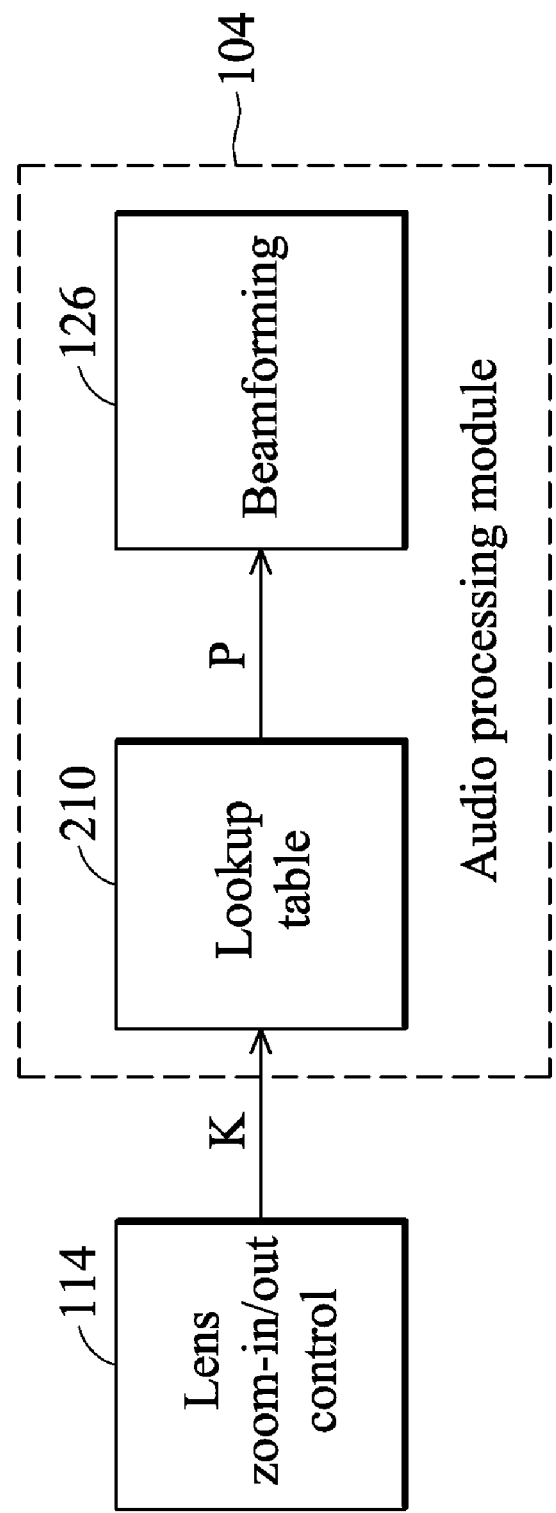
FIG. 2 is a block diagram of an embodiment of an audio processing module of FIG. 1 according to the invention.

Referring to FIG. 2, a block diagram of an embodiment of the audio processing module 104 according to the invention is shown. The lens zoom-in/out control module 114 of the video processing module 102 generates a zoom-in/out control signal K to adjust a focal length of the video camera 112. In addition to a beamforming module 126, the audio processing module 104 also comprises a lookup table 210. The lookup table 210 stores a plurality of groups of beamforming parameter values corresponding to a plurality of focal lengths, wherein different groups of beamforming parameter values further correspond to different beamwidths for beamforming. When the lookup table 210 receives the zoom-in/out control signal K, the lookup table 210 determines a focal length represented by the zoom-in/out control signal K, and then outputs a group of beamforming parameter values corresponding to the focal length. The beamforming module 126 then performs a beamforming process according to the beamforming parameter values, thus, adjusting the beamwidth of the beamforming process.

Figure 3:
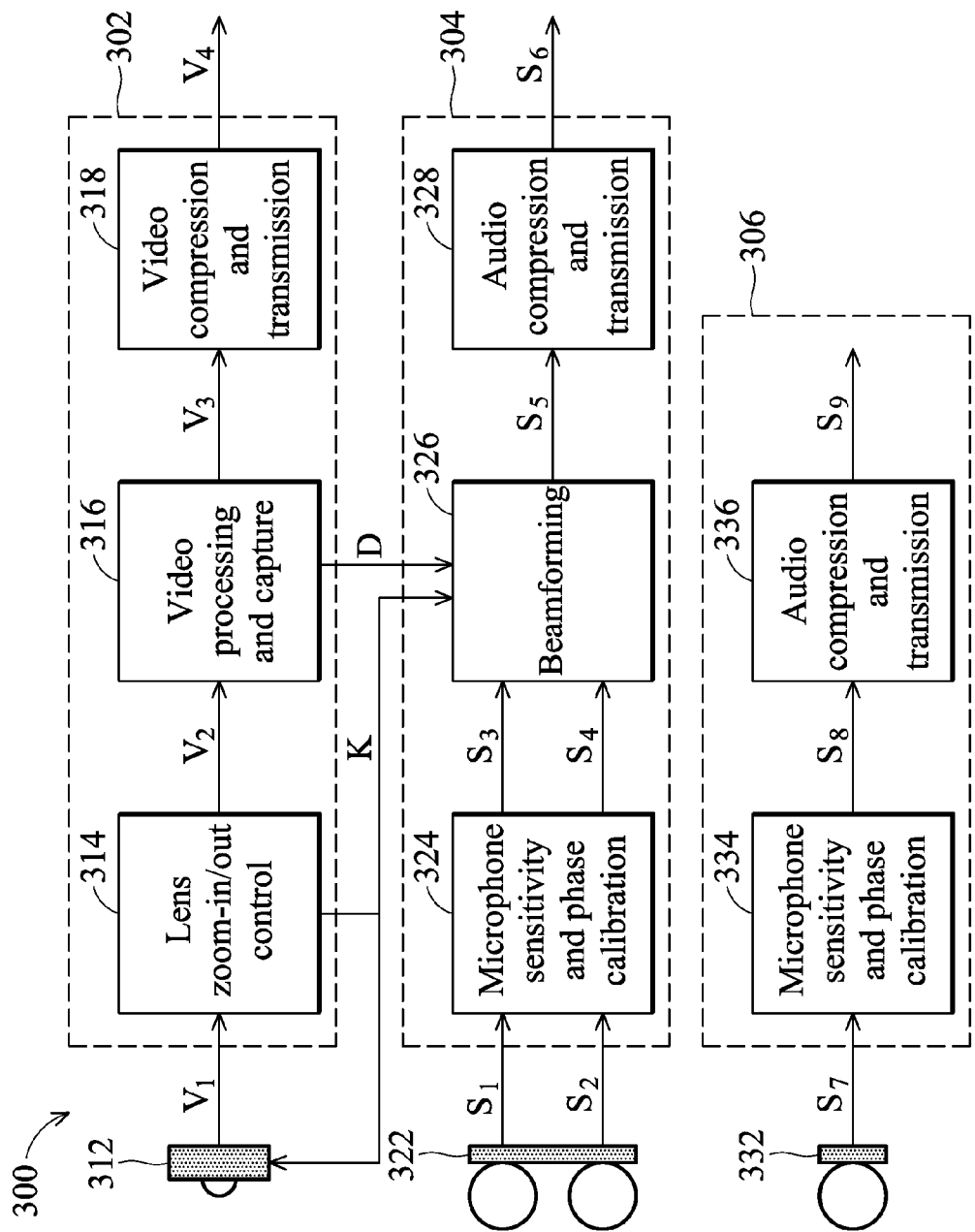
FIG. 3 is a block diagram of another embodiment of an electronic apparatus according to the invention.

Referring to FIG. 3, a block diagram of another embodiment of an electronic apparatus 300 according to the invention is shown. In one embodiment, the electronic apparatus 300 is a notebook, a cell phone, or a personal digital assistant (PDA). The electronic apparatus 300 comprises a video camera 312, a video processing module 302, an array microphone 322, a microphone 332, and audio processing modules 304 and 306. Except for additional modules such as the microphone 332 and the audio processing module 306, the other component modules of the electronic apparatus 300 are similar to corresponding ones of the electronic apparatus 100 of FIG. 1.

Figure 4:
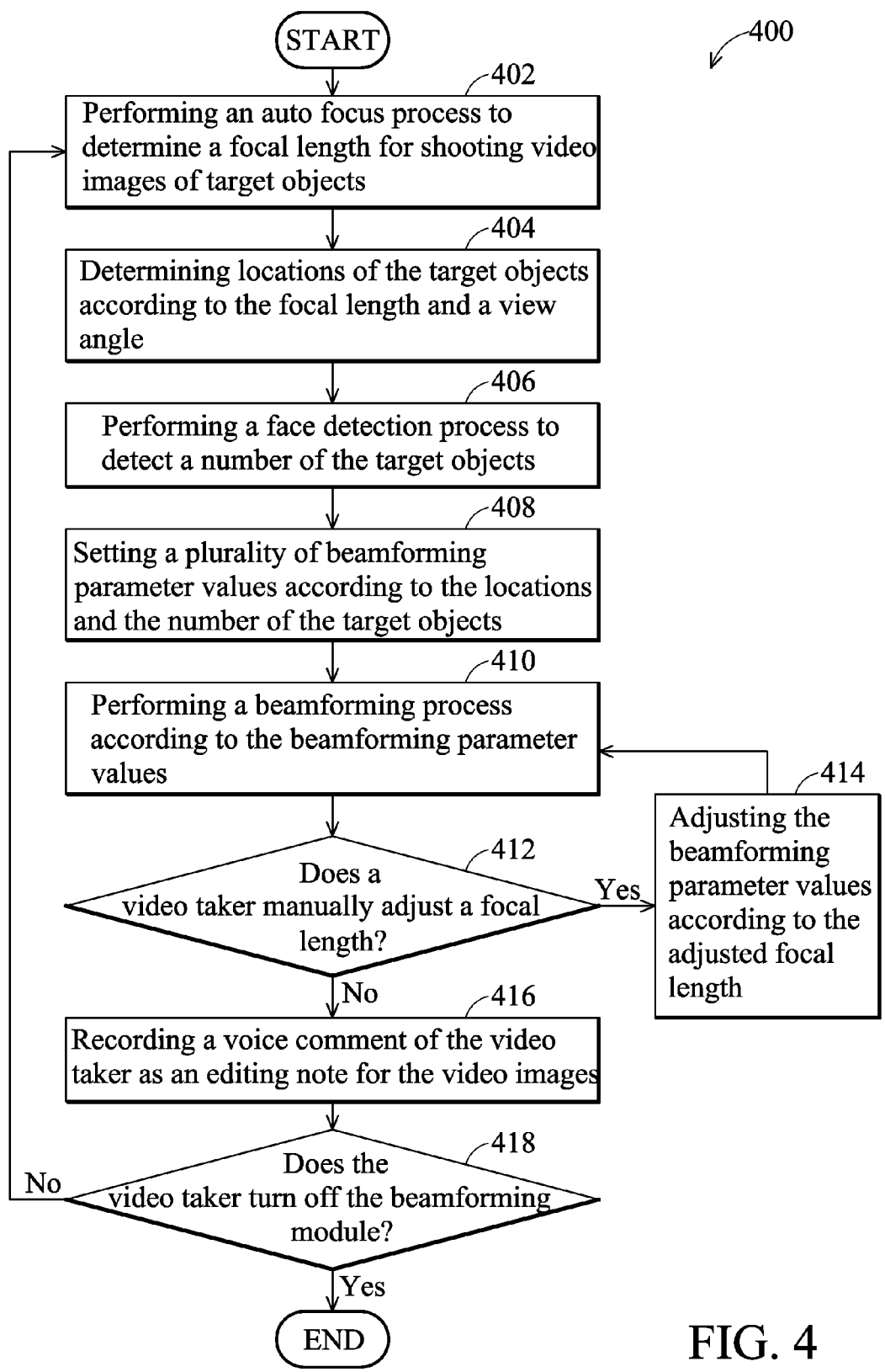
FIG. 4 is a flowchart of a method for receiving sounds with auxiliary information from a camera system according to the invention.

Referring to FIG. 4, a flowchart of a method 400 for receiving sounds with auxiliary information from a camera system according to the invention is shown. The electronic apparatus 300 operates according to the method 400. First, a lens zoom-in/out control module 314 of the video processing system 302 performs an auto focus process to determine a focal length K of the video camera 312 (step 402). The video camera 312 then captures an image of at least one target objects according to the focal length K to obtain a raw video signal $V_1$. In one embodiment, the video processing module 302 also determines a view angle for capturing the image of the target object. A video processing and capture module 316 of the video processing module 302 then performs a face detection process to detect a number D of the at least one target object (step 406).

The array microphone 322 then converts a sound of the target object to a plurality of raw audio signals $S_1$ and $S_2$. A microphone sensitivity and phase calibration module 324 amplifies the raw audio signals $S_1$ and $S_2$ and removes phase mismatches therebetween to obtain calibrated audio signals $S_3$ and $S_4$. A beamforming module 326 of the audio processing module 304 then determines a location of the target object according to the focal length K and the view angle (step 404). The beamforming module 326 then sets a plurality of beamforming parameter values according to the location and the number D of the at least one target object (step 408). In one embodiment, the beamforming parameter values comprise a distance parameter value and an angle parameter value for a beamforming process. The beamforming module 326 then performs the beamforming process on the calibrated signals $S_3$ and $S_4$ according to the beamforming parameter values to obtain an audio signal $S_5$ comprising mainly sound components of the target object (step 410).

A video taker may manually adjust the focal length K of the video camera 312 to capture the image with a proper range. When the video taker manually adjust the focal length (step 412), the beamforming module 326 of the audio processing module 304 adjusts the beamforming parameter values according to the adjusted focal length (step 414), and then performs a beamforming process according to the adjusted beamforming parameter values (step 410). In addition, a microphone 332 converts a voice comment of the video taker into an audio signal $S_7$, wherein the voice comment is taken as a note for editing the video signal $V_4$. A microphone sensitivity and phase calibration module 334 of the audio processing module 306 then amplifies the raw audio signals $S_7$ to obtain an audio signal $S_8$, and an audio compression and transmission module 336 of the audio processing module 306 then compresses the audio signal $S_8$ to obtain a compressed audio signal $S_9$. The audio processing module 306 then records the compressed audio signal $S_9$ for video editing reference (step 416). The electronic apparatus 300 operates according to the method 400 until the video taker turns off the beamforming module 326.

The invention provides an electronic apparatus comprising both a microphone system and a camera system. When the camera system generates video shooting information such as a focal length of a camera, the microphone system takes the video shooting information as auxiliary information for performing a beamforming process, thus, increasing accuracy of the beamforming process and improving performance of the microphone system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, comprising: a video camera, adjusting a focal length according to a zoom-in/out control signal and capturing an image of at least one target object according to the focal length to generate a raw video signal; a video processing module, coupled to the video camera, generating the zoom-in/out control signal to adjust the focal length of the video camera; an array microphone, comprising a plurality of microphones converting sounds of the target object into a plurality of raw audio signals; and
    an audio processing module, coupled to the array microphone, adjusting a beamwidth for beamforming according to the focus length indicated by the zoom-in/out control signal, and performing a beamforming process according to the beamwidth on the raw audio signals to generate a first audio signal comprising mainly voice components of the target object; and wherein the audio processing module comprises:
    a lookup table, generating a plurality of beamforming parameter values according to the zoom-in/out control signal for adjusting the beamwidth; and
    a beamforming module, coupled to the lookup table, performing the beamforming process according to the beamforming parameter values to generate the first audio signal.

2. The electronic apparatus as claimed in claim 1, wherein when the zoom-in/out control signal lengthens the focal length for capturing the image, the audio processing module broadens the beamwidth for generating the first audio signal to cover a wider range, otherwise, when the zoom-in/out control signal shortens the focal length for capturing the image, the audio processing module narrows the beamwidth for generating the first audio signal to cover a narrower range.

3. The electronic apparatus as claimed in claim 1, wherein the audio processing module further comprises:
    a microphone sensitivity and phase calibration module, coupled between the array microphone and the beamforming module, adjusting amplitudes of the raw audio signals and calibrating phase mismatches between the raw audio signals; and
    an audio compression and transmission module, coupled to the beamforming module, compressing the first audio signal to obtain a second audio signal with less data amount than that of the first audio signal.

4. The electronic apparatus as claimed in claim 1, wherein the video processing module comprises:
    a lens zoom-in/out control module, generating the zoom-in/out control signal to adjust the focal length of the video camera; and
    a video compression and transmission module, compressing the raw video signal to obtain a compressed video signal with less data amount than that of the raw video signal.

5. The electronic apparatus as claimed in claim 4, wherein the lens zoom-in/out control module generates the zoom-in/out control signal according to the raw video signal to automatically adjust the focal length.

6. The electronic apparatus as claimed in claim 4, wherein the lens zoom-in/out control module generates the zoom-in/out control signal according to a video taker's manual adjustment.

7. The electronic apparatus as claimed in claim 1, wherein the electronic apparatus is a notebook, a cell pone, or a personal digital assistant (PDA).

8. An electronic apparatus, comprising:
    a video camera, receiving a focal length and capturing an image of at least one target object according to the focal length to generate a raw video signal;
    a video processing module, coupled to the video camera, performing an auto focus process to determine the focal length;
    an array microphone, comprising a plurality of microphones converting sounds of the target object into a plurality of raw audio signals; and
    a first audio processing module, coupled to the array microphone, setting a plurality of beamforming parameter values according to the focal length locations of the target, and performing a beamforming process according to the beamforming parameter values on the raw audio signals to generate a processed audio signal comprising mainly voice components of the target object; and wherein the video processing module performs a face detection process on the raw video signal to detect a number of the target object, and the first audio processing module sets the beamforming parameter values according to the number of the target object in addition to the locations of the target object.

9. The electronic apparatus as claimed in claim 8, wherein the video processing module determines a view angle for capturing the image of the target object, and the first audio processing module determines the locations of the target object according to the view angle in addition to the focal length.

10. The electronic apparatus as claimed in claim 8, wherein the beamforming parameter values comprise a distance parameter value and an angle parameter value for the beamforming process.

11. The electronic apparatus as claimed in claim 8, wherein when a video taker manually adjusts the focal length of the video camera for capturing the image, the first audio processing module adjusts the beamforming parameter values according to the manually adjusted focal length, and performs the beamforming process according to the adjusted beamforming parameter values on the raw audio signals to generate the processed audio signal.

12. The electronic apparatus as claimed in claim 8, wherein the electronic apparatus further comprises:
   a microphone, converting a video taker's voice comments into a comment audio signal; and
   a second audio processing module, coupled to the microphone, recording the comment audio signal as an editing note for the raw video signal.

13. The electronic apparatus as claimed in claim 8, wherein the electronic apparatus is a notebook, a cell pone, or a personal digital assistant (PDA).

14. A method for receiving sounds, comprising: generating a zoom-in/out control signal for adjusting a focal length of a video camera, wherein the video camera captures an image of at least one target object according to the focal length;
   converting sounds of the target object into a plurality of raw audio signals with a plurality of microphones of an array microphone;
      adjusting a beamwidth for beamforming according to the focus length indicated by the zoom-in/out control signal; and performing a beamforming process according to the beamwidth on the raw audio signals to generate a processed audio signal; and generating a plurality of beamforming parameter values according to the zoom-in/out control signal with a lookup table for adjusting the beamwidth; and performing the beamforming process according to the beamforming parameter values to generate the processed audio signal.

15. The method as claimed in claim 14, wherein adjustment of the beamwidth comprises:
   when the zoom-in/out control signal lengthens the focal length for capturing the image, broadening the beamwidth for generating the processed audio signal to cover a wider range; and
   when the zoom-in/out control signal shortens the focal length for capturing the image, narrowing the beamwidth for generating the first audio signal to cover a narrower range.

16. The method as claimed in claim 14, wherein the method comprises:
   performing a face detection process on the raw video signal to detect a number of the target object; and
   adjusting the beamwidth for beamforming according to the number of the target object in addition to the zoom-in/out control signal.

17. The method as claimed in claim 14, wherein the zoom-in/out control signal is generated by performing an auto focus process and can be manually adjusted by a video taker.

* * * * *